(12) United States Patent
Doss et al.

(10) Patent No.: US 6,433,274 B1
(45) Date of Patent: Aug. 13, 2002

(54) POWER CONVERTER DEVICE

(75) Inventors: Jeffrey Doss; Charles Lord, both of Scottsdale, AZ (US)

(73) Assignee: Mobility Electronic, Inc., Scottsdale, AZ (US)

( * ) Notice: Subject to any disclaimer, the term of this patent is extended or adjusted under 35 U.S.C. 154(b) by 0 days.

(21) Appl. No.: 09/478,746

(22) Filed: Jan. 6, 2000

(51) Int. Cl.[7] .................................................. H02G 3/08
(52) U.S. Cl. ............................. 174/50; 174/59; 174/53; 191/12.2 R; 191/12.4
(58) Field of Search ................................ 174/50, 17 R, 174/50.52, 51, 53, 135, 59; 191/12.4, 12.2 R, 12 R; 439/4, 528; 242/404; 379/438, 437; D13/137.4

(56) References Cited

U.S. PATENT DOCUMENTS

| | | | | |
|---|---|---|---|---|
| 3,372,887 A | * | 3/1968 | Ladany | 174/135 |
| 3,733,478 A | * | 5/1973 | Barker | 174/50 |
| 4,138,177 A | * | 2/1979 | van Valer | 191/12.4 |
| 4,467,979 A | * | 8/1984 | Koehler | 191/12.4 |
| 5,177,665 A | * | 1/1993 | Frank et al. | 361/380 |
| 5,481,607 A | * | 1/1996 | Hsiao | 379/438 |
| 5,679,925 A | * | 10/1997 | Dilley | 174/53 |
| 5,855,262 A | * | 1/1999 | Jackson | 191/12.4 |
| 6,077,108 A | * | 6/2000 | Lorscheider et al. | 439/4 |
| D434,000 S | * | 11/2000 | Miller | D13/137.4 |
| D432,084 S | * | 12/2000 | Miller | D13/137.4 |
| 6,135,254 A | * | 12/2000 | Liao | 191/12.4 |
| 6,170,775 B1 | * | 1/2001 | Kovacik et al. | 242/404 |
| 6,199,674 B1 | * | 3/2001 | Liao | 191/12 R |

\* cited by examiner

*Primary Examiner*—Dean A. Reichard
*Assistant Examiner*—Angel R. Estrada
(74) *Attorney, Agent, or Firm*—Thomas L. Adams (57) ABSTRACT

Two juxtaposed retraction reels automatically and independently retract an output power plug cable and an input power cable connected to an accessory power input plug. The cables are connected to a power converter for converting electrical power to voltage and current power levels for use in lap top computers and so on. The input plug has a second Em power plug / auto-air adapter mechanically and ohmically coupled thereto for use with other power sources such as in airplanes and so on. A slider holds the plug tip to the carrying housing in the carrying mode, the retraction reel holding the other power input plug end to the housing via its cable.

23 Claims, 9 Drawing Sheets

POWER CONVERTER DEVICE

BACKGROUND OF THE INVENTION

1. Field of the Invention

This invention relates to power converters devices for converting one power level to another, and more particularly, to a converter and plug assembly for converting power for use with portable computers.

2. Description of Related Art

U.S Pat. No. 5,481,607 discloses a cord rewinder with a plug that connects to a jack on a telephone. The rewinder rewinds a cable that connects to the telephone handset.

U.S Pat. No. 4,138,177 discloses a power distribution system for furnishing power to vehicles from a fixed station. A power plug is connected to a cable that can be pulled from a wind-up reel. The reel includes contact switches that connect power from a fixed location to the rotating reel. The plug can be connected to an electric utility outlet to provide power to a vehicle and the like. When an ignition switch in the vehicle is operated, a solenoid boots the power plug and an electrically powered brake is released to rewind the power cable.

U.S Pat. No. 5,177,665 discloses a stand for supporting a portable computer on an automobile steering wheel. The stand has a connector for supplying power to the computer from the automobile power system. The above patents are incorporated by reference herein as if fully set forth herein.

SUMMARY OF THE INVENTION

The present invention is a recognition of a need for a power adapter for converting electrical power or other sources for use in portable computers and the like, while providing a separate wind up cable for each of the input and output plugs.

In accordance with the illustrative embodiments demonstrating features and advantages of the present invention, there is provided an electrical power adapter. This adapter comprises an input plug with a first cable. An output plug has a second cable. A converter is provided for converting electrical power at the input plug to an output power at the output plug and retraction means are included for independently retracting the first and second cables.

In one aspect, the retraction means includes first and second reels, each for receiving a different cable.

In a further aspect, a housing is provided for containing the retraction means and the converter.

The input plug may include a body and means for accessing power in an automotive power outlet and a third plug for accessing power from an outlet different than the automotive outlet, the input and third plugs including means for releasably ohmically connecting each other to form a single plug.

The third plug may be an Em power plug / auto-air adapter secured to the input plug body.

The input plug in a further aspect has a longitudinal axis, the housing including support means for holding the input plug axis upright relative to gravity on a horizontal support.

The input plug in a still further aspect has a longitudinal axis, the housing including support means for holding the input plug axis horizontal relative to gravity on a horizontal support.

In a further aspect, the input plug includes a terminal pin, the housing including a slider arranged to releasably hold the pin and the input plug to the housing.

Preferably, the first and second reels are juxtaposed one over the other.

In a further aspect, at least one coupler is secured to the housing for coupling the first and second reels for independent rotation in response to a pulling force on the corresponding cable.

In a further aspect, a power converter adapter for use with an electrical power source of a given voltage and current comprises a housing; a first plug connected to a first cable for receiving the given voltage and current as an input and applying the input power to the first cable; a converter for converting the received input power on the first cable to an output electrical power having a voltage and current different from the first power source; a second cable for receiving output power from the converter and applying the received output power to an output plug for coupling the output power to an electrical apparatus; and a slider connected to the housing for releasably securing the first plug to the housing.

BRIEF DESCRIPTION OF THE DRAWINGS

The above brief description as well as other objects, features and advantages of the present invention will be more fully appreciated by reference to the following detailed description of presently preferred but nonetheless illustrative embodiments in accordance with the present invention when taken in conjunction with the accompanying drawings, wherein.

DETAILED DESCRIPTION OF THE PREFERRED EMBODIMENTS

Referring to FIGS. 1–9 and 11–15, adapter assembly 2 comprises a housing 4, an input adapter plug 6 for mating with a conventional cigarette lighter socket in a vehicle and an output plug 8 for applying power to an accessory such as a lap top computer (not shown) and so on.

Figure 1:
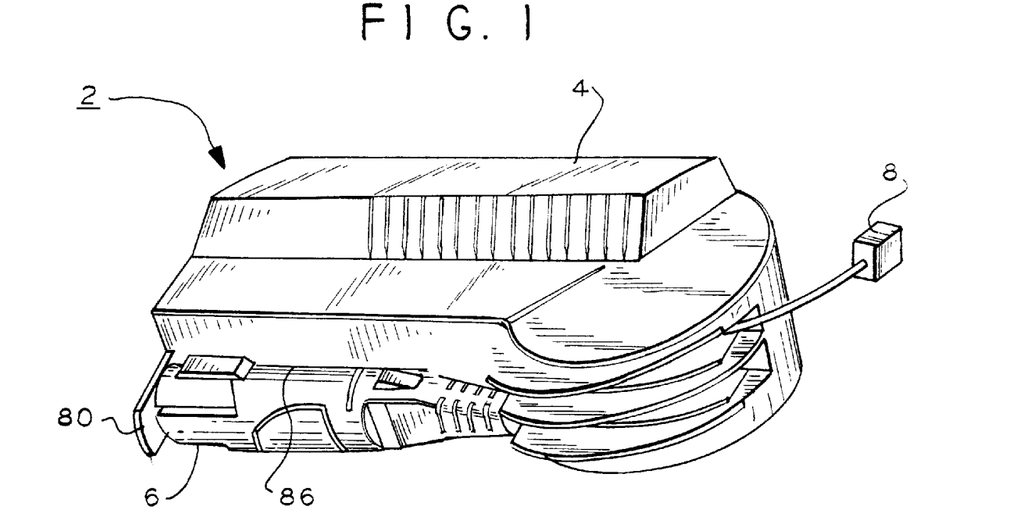
FIG. 1 is a perspective view of an adapter according to one embodiment of the present invention.
Figure 2:
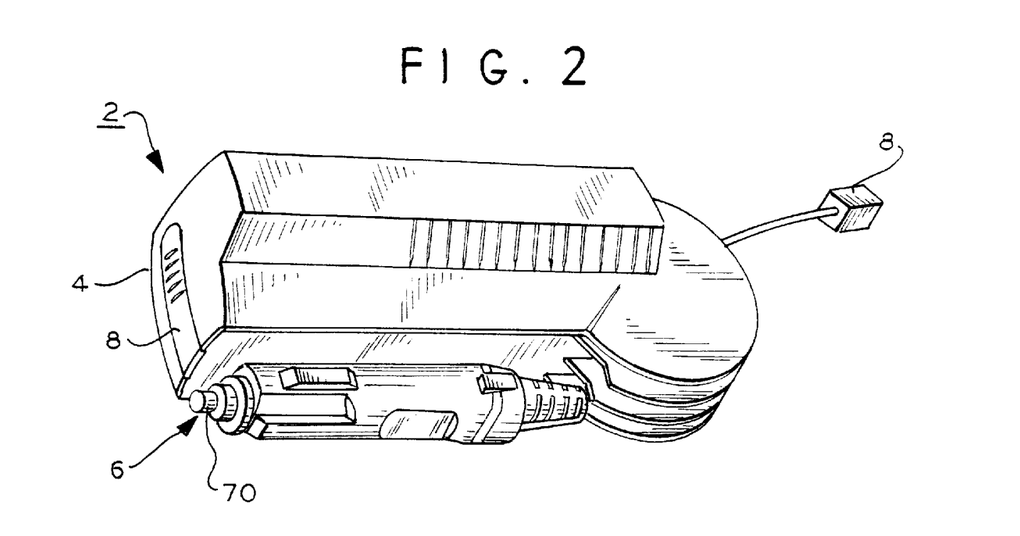
FIG. 2 is a perspective second view of the adapter of FIG. 1.
Figures 3, 4, 5, 6:
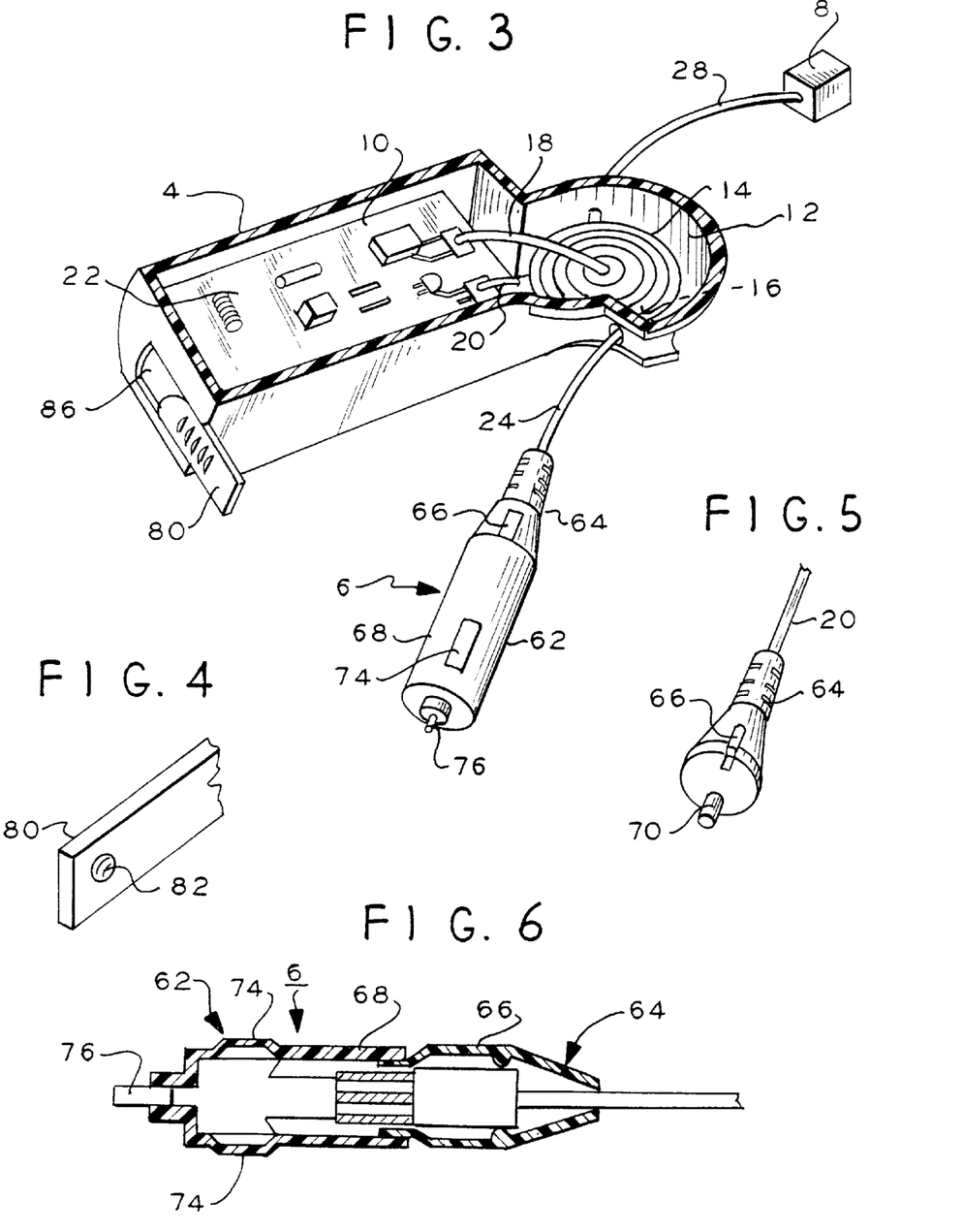
FIG. 3 is an isometric sectional view of the adapter of FIG. 1.
FIG. 4 is an isometric view of a slider used in the embodiment of FIGS. 1–3.
FIG. 5 is an isometric view of a second plug employed with the adapter plug of FIGS. 1–3.
FIG. 6 is a side elevation, sectional view of the power input plug of FIGS. 1–3.

In FIG. 3, adapter assembly 2 includes a power converter 10 which preferably is a printed circuit board circuit. The converter 10 converts DC voltage, for example, 12 volts as supplied by a vehicle battery to an output voltage and current useful, for example, for use with a portable computer (not shown). Not shown are circuits in converter 10 for regulating the voltage and current output levels or for switching output levels to different values as desired. Such output levels are known and can be provided in any desired range of values and/or combination of voltage and current values.

Located within the housing 4 chamber 12 at one housing end are a pair of stacked electrical cable retraction mechanisms 14 and 16 (one being shown in FIG. 3). An electrical cable 18, which may include a power conductor and a ground conductor, is connected to mechanism 14 and a second electrical cable 20, also containing a power conductor and a ground conductor, is connected to mechanism 16.

The cable 18 is electrically connected to the power output circuit of the converter 10 for receiving the converted power output to be applied to an electrical appliance such as a lap top computer and so on. The cable 20 is electrically connected to the power input circuit of converter 10. The conversion circuit 22 of converter 10 is conventional.

Figure 7:
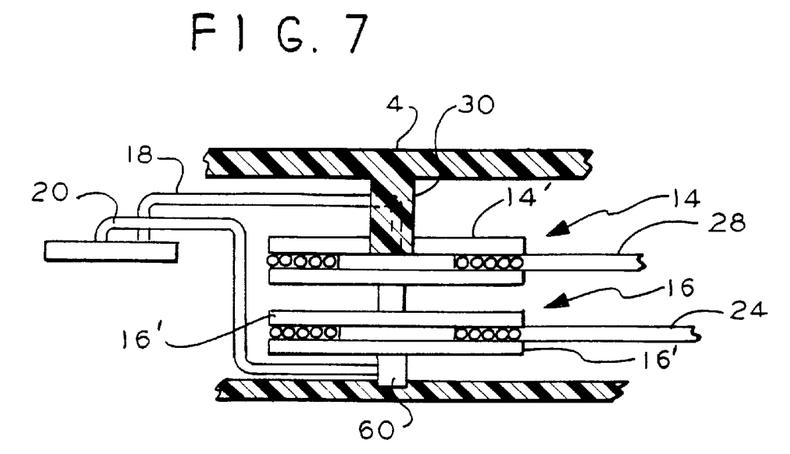
FIG. 7 is a diagrammatic, sectional, fragmented, side elevation view of the retractors employed in FIG. 1.
Figure 11:
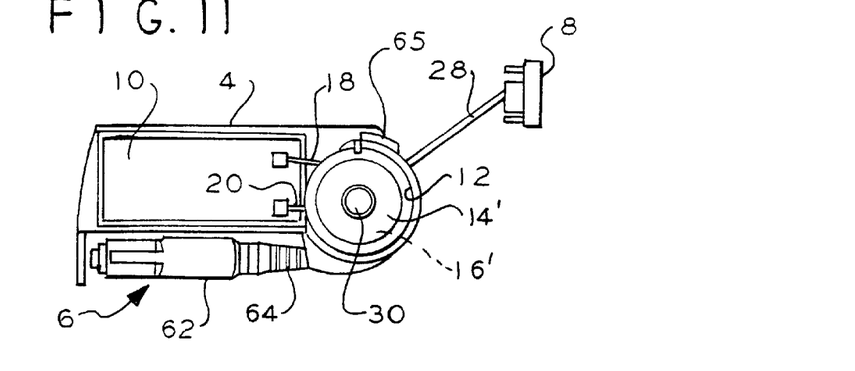
FIG. 11 is a top plan sectional view of the adapter of FIG. 1.
Figure 12:
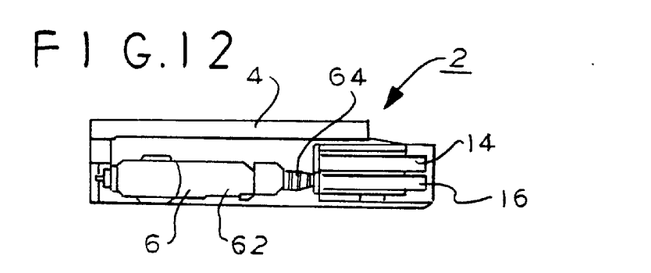
FIG. 12 is a side elevation sectional view of the adapter of FIG. 1.
Figure 13:
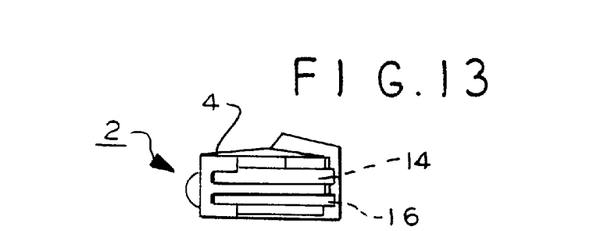
FIG. 13 is an end elevation sectional view of the adapter of FIG. 1.

The mechanisms 14 and 16 each include a respective retraction reel 14' and 16', FIGS. 7 and 11. In FIG. 3, a power input cable 24 is ohmically connected to plug 6 at one end and wrapped about the retraction reel 16 at its other end 26. An output cable 28, FIG. 3 is connected ohmically to plug 8 at one end and is wrapped about the reel 14 at its other end.

The reels 14' and 16' each include spring loaded retraction devices (not shown) as known in this art, as for example shown in the aforementioned U.S. Pat. Nos. 4,138,177 and 5,481,607 incorporated by reference herein. These devices automatically retract the corresponding cables 28 and 24 thereabout in corresponding recesses in the reels 14 and 16. The cables when pulled from the reels load the springs thereof for retraction when the cables are released. Not shown also are detents for holding the deployed cables, as may be optionally desired. To retract the cables, the cables are pulled slightly to release the detents and permit the reels to retract the cables or a release button 65, FIG. 11 may be used to release the reels employing a reel retention leaf spring in a ratchet mechanism.

Figure 8:
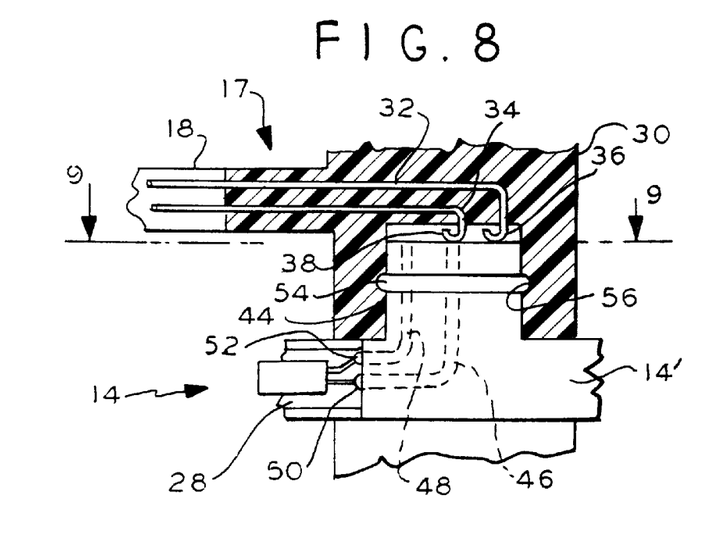
FIG. 8 is a more detailed, fragmented, sectional, side elevation view of the embodiment of FIG. 7.
Figure 9:
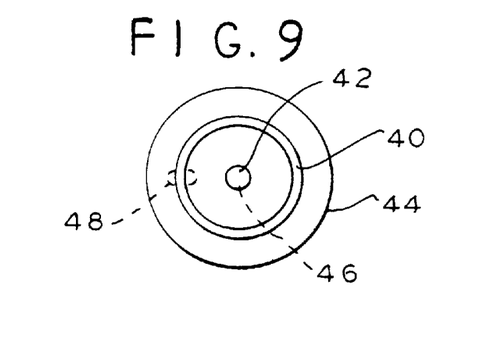
FIG. 9 is a plan view of the embodiment of FIG. 8 taken along lines 9—9.

The cable 18 from the convertor 10 is ohmically connected to the output cable 28 through a slip ring connector as known in this art. For example, U.S. Pat. No. 4,138,177 discloses such a slip ring connector. In FIG. 8, the slip ring connector assembly 17 is representative. In assembly 17, cable 18 passes through a spindle 30 in the housing 4. The spindle 30 includes a pair of conductors 32 and 34. Conductors 32 and 34 are connected to the respective ground and signal conductors of cable 18 via terminals (not shown). The conductors 32 and 34 terminate in respective spring slide contacts 36 and 38. The contacts 36 and 38 slide against respective planar contacts 40 and 42 (FIG. 9) located at the surface of spindle 44.

Contact 40 is a ring and contact 42 is a central pad within the contact 40. The contact 40 is coupled electrically to terminal 52 by conductor 48 in spindle 44 and the contact 42 is coupled electrically to terminal 50 by conductor 46 in the spindle 44. The conductors of cable 28 are respectively electrically connected to terminals 50 and 52.

The spindle 44 has an annular ridge 54 and the spindle 30 has an annular groove 56 in which ridge 54 snap fits and is rotationally and axially secured. The rotationally fixed spindle 30 acts as a bearing for spindle 44 which rotates in a mating bore in the spindle 30. Thus cable 28 can rotate about and with the reel 14 while maintaining electrical contact with the output cable 18. The plug 8 thus receives the output power from the cable 18.

In similar fashion, the input cable 20 for inputting power to the convertor 10 is connected mechanically and electrically to spindle assembly 60, FIG. 7, via an assembly similar to, but in mirror image to, the assembly 17. Assemblies 17 and 60 both rotationally support the respective reels 12 and 16 and couple power thereto from the and to the convertor 10. The other ends of the cables 18 and 20 are connected to suitable circuits in the convertor 10. Thus the cables 18 and 20 remain fixed at each end to either the convertor or to the corresponding reel 14 and 16 spindle assemblies.

The retraction mechanism is incorporated in each reel 14 and 16 for independent operation. Thus the plug 8, FIG. 3, can be pulled from the corresponding reel 14 without unwinding the cable 24 to the input plug 6. Preferably, the reels 14 and 16 are coaxial, one juxtaposed over the other. In the alternative, they may be placed side by side.

In FIGS. 3, 5 and 6, the plug 6 comprises a set of axially aligned male plugs 62 and 64. The plug 64 is an Em power plug / auto-air adapter. The plug 64 has a latch 66 which latches to the plug 6 housing 68. The plug 64 has a male electrical probe 70 comprising two concentric cylindrical contacts, a signal contact, the inner contact, and a ground contact, the outer contact.

The plug 62 has conventional spring loaded ground contacts 74 and a center pin contact 76. The contacts 74 are connected to a further contact which engages the received outer ground contact of the probe 70 and the center pin contact 76 is connected to a further contact for engaging the center contact of the probe 70. In this way the pin contact 76 is the extension of the Em center contact of the probe 70 and the ground contacts 74 are extensions of the outer ground contact of the probe 70. The Em power plug / auto-air adapter is for use with airline provided power sockets, for example. This enables the accessory to be plugged into a power source on a plane during travel or to an automobile socket with the plug 62 (auto-air adapter) attached to plug 64.

A slider 80, FIGS. 3 and 4, is slidably secured to the end of the housing 4. The slider 80 has a retracted position, FIG. 2, and an extended position, FIG. 3. The slider 80 has a depression 82, FIG. 4, for receiving the pin contact 76 of the plug 6. The depression holds the contact 76 end of the plug to the housing 4 in a housing recess 86. The other end of the plug 6 is held to the housing 4 by its cable 24 which is resiliently retracted by the reel 16 mechanism.

Figure 10:
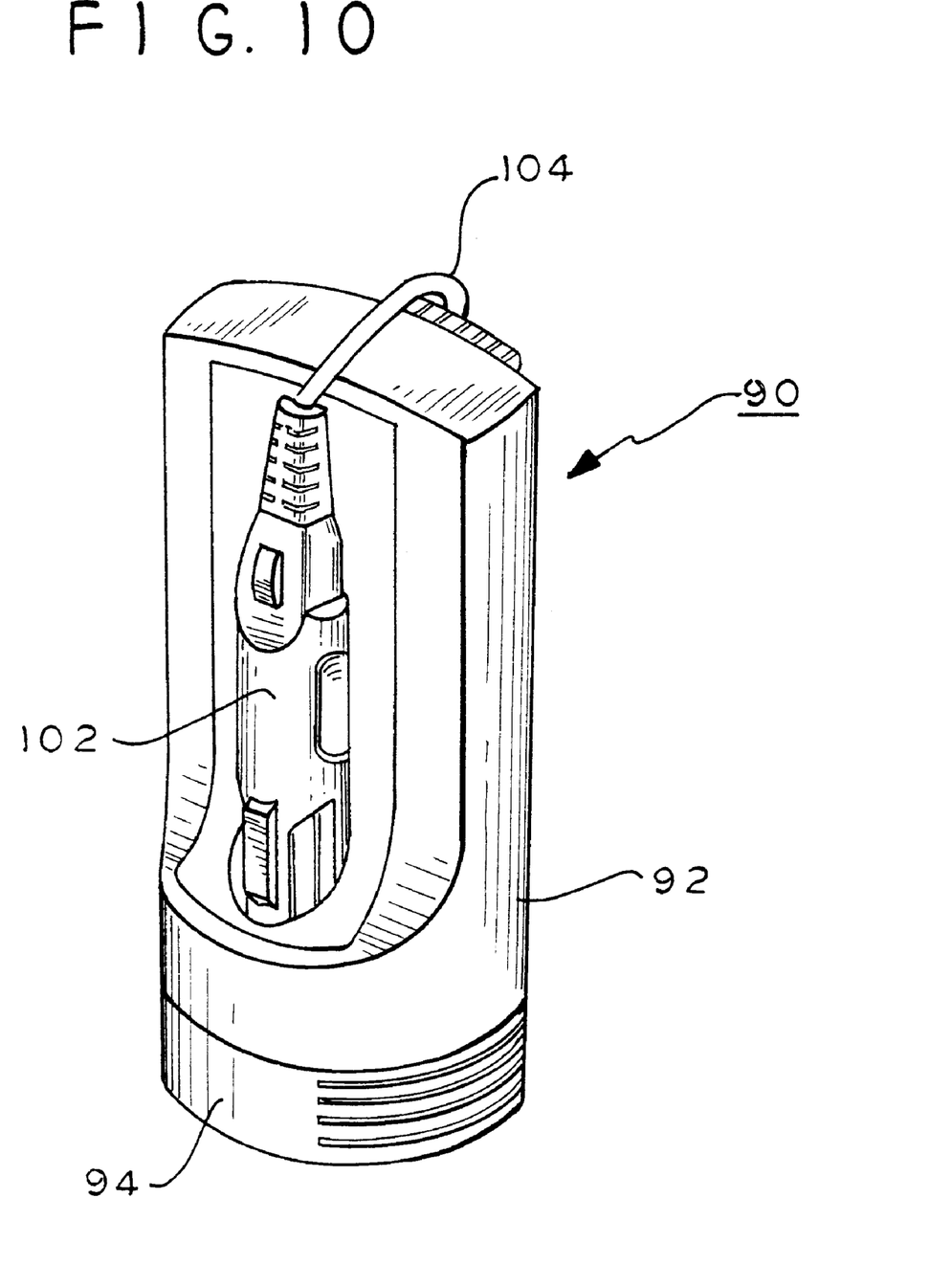
FIG. 10 is a perspective view of an adapter according to a second embodiment of the present invention.
Figure 14:
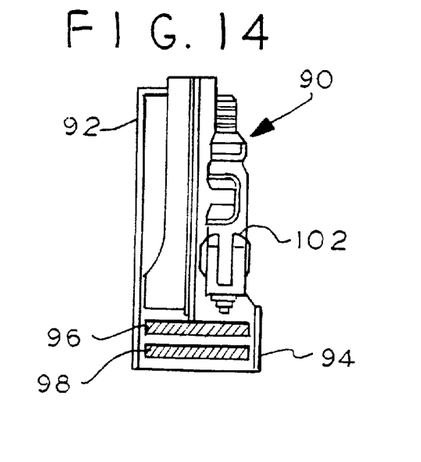
FIGS. 14 and 15 are respective side and front elevation views partially in section of the embodiment of FIG. 10.
Figure 15:
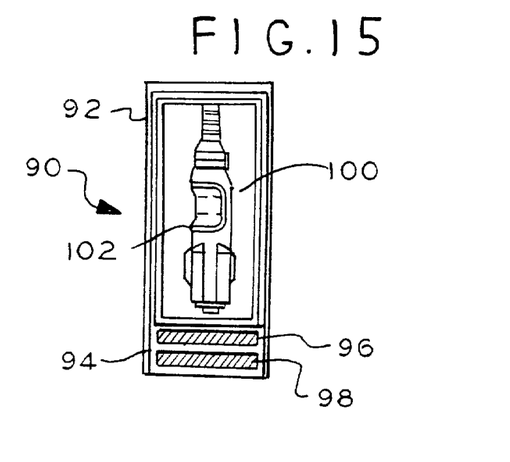

In FIGS. 10, 14 and 15, an alternative embodiment is illustrated. This embodiment employs an upright adapter 90. The adapter 90 includes a housing 92 having a base 94 for resting upright on a support. The base 94 has two retraction reels 96 and 98 which preferably are as described above in connection with the reels 14 and 16. In this case, the reels rotate in planes normal to the plane of the printed circuit board of the convertor 100. The reels may otherwise be attached to spindles and slip rings for mechanical and electrical connection as described above.

The plug 102 may be identical to the plug 6 described hereinabove. The plug 102 output cable 104 may lay over the upper edge of the housing and enter through a port in the housing 92 at the lower rear (not shown) for attachment to the lower reel 98.

The plug 102 forward contact pin and nose region at the bottom of the housing are contained within a recess compartment of the housing 92. The rear of the plug 102 is thus held in place by the cable 104. The plug 102 may include an Em power plug / auto-air adapter as described above as a releasable unit attached thereto.

Figure 16:
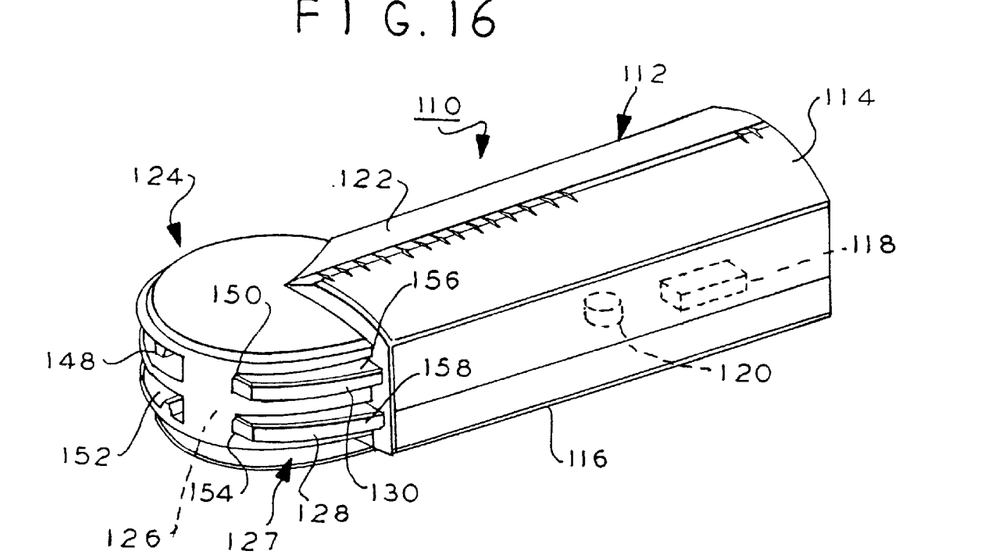
FIG. 16 is an isometric view of an adapter according to a further embodiment of the present invention.
Figure 19:
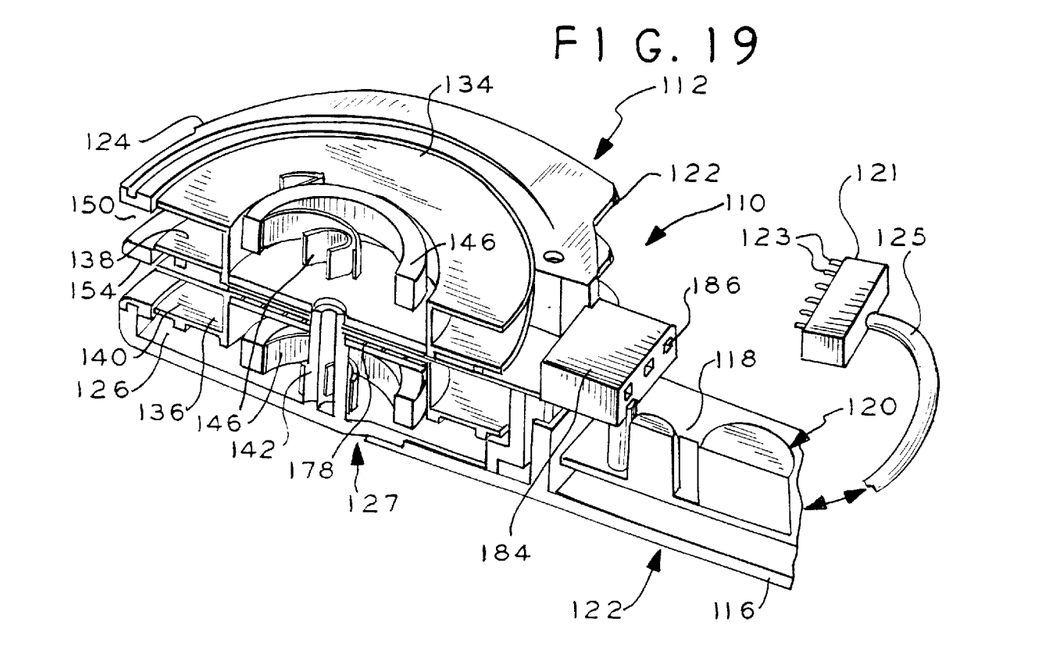
FIG. 19 is a perspective sectional side elevation schematic view similar to the view of FIG. 18 showing a portion of the electrical circuit components.

In FIG. 16, adapter 110 comprises a housing 112, which may be one piece molded thermoplastic, having an upper half 114 hinged to a lower half 116 by a living hinge (not shown) or journalled to hinge pins and bearings (not shown). The housing 112 has a circuit compartment 118 in portion 122 for enclosing the power conversion circuit 120 (FIG. 19). The housing 112 has a retraction mechanism portion 124 which has a retraction compartment 126. The retraction mechanism 127 located in compartment 126 includes two reel release and catch levers 128 and 130 pivotally secured to the housing 112 by pivot pins 132, FIG. 17, (one being shown), the pins being mounted in a mating journal opening 133, FIGS. 20 and 21, formed in the housing portion 124.

Figure 18:
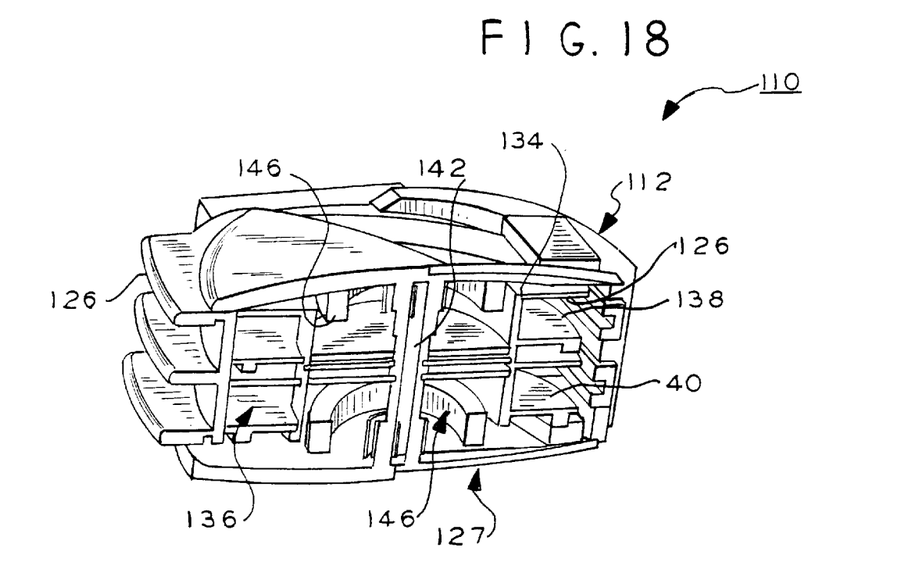
FIG. 18 is a perspective sectional side elevation schematic view of the reel portion of the adapter of FIG. 16.

In FIGS. 18 and 19, the retraction mechanism 127 includes two cable storage reels 134 and 136 located in compartment 126. Each reel has a circular cylindrical U-shaped channel 138, 140 for receiving a separate input or output power cable such as, for example, input cable 24 and output cable 28, FIG. 3. The upper reel receives the output cable and the lower reel receives the input cable in this example. The reels 134, 136 are rotatably mounted on a spindle 142 fixed to the housing 112 and which may be molded one piece with the housing. The reels rotate about the stationary spindle 142.

Figure 17:
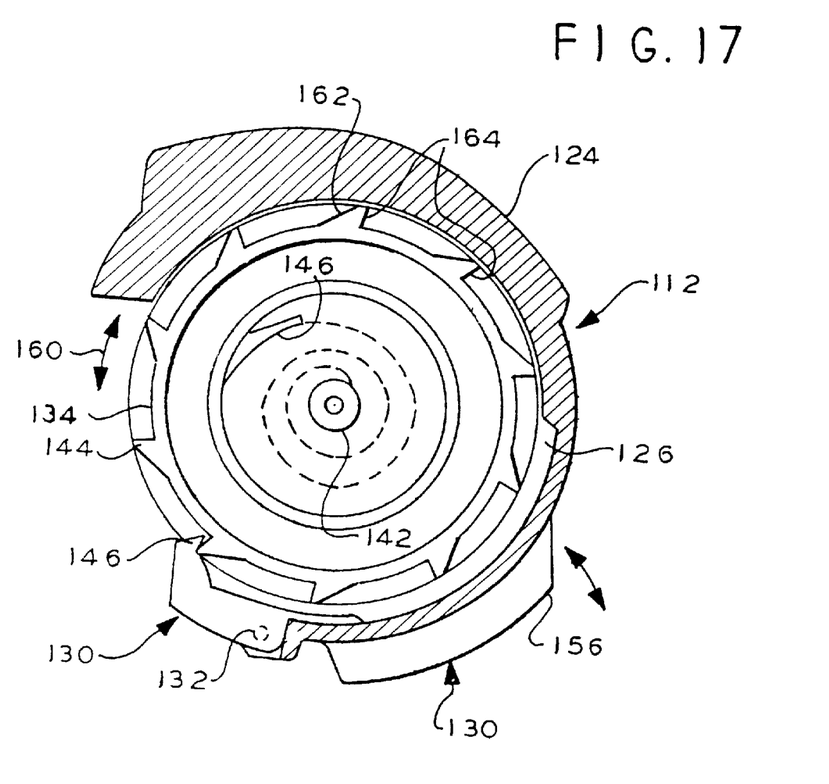
FIG. 17 is a sectional top plan view of the reel portion of the adapter of FIG. 16.

Attached to each reel at its exterior peripheral edge is an annular array of identical ratchet teeth 144, FIG. 17. A pawl 146 extends from each lever 128, 130, lever 130 being shown in this figure. The levers 128 and 130 are resiliently rotationally held with the corresponding pawl in engagement with a ratchet tooth of the corresponding reel by a spring (not shown, and which may be a compression or leaf spring, for example) secured to the housing.

Two constant force springs 146, partially shown in FIGS. 17–20, which are a spiral metal spring, have one end secured to the spindle 142 and the other end secured to a corresponding reel 134 and 136. The constant force springs are connected to the radial innermost surface of the reels. The ratchet teeth are formed on each of the reels radial outmost surface by way of example, or may be at an upper or lower outer peripheral edge or otherwise attached to each reel according to a given implementation.

Figure 20:
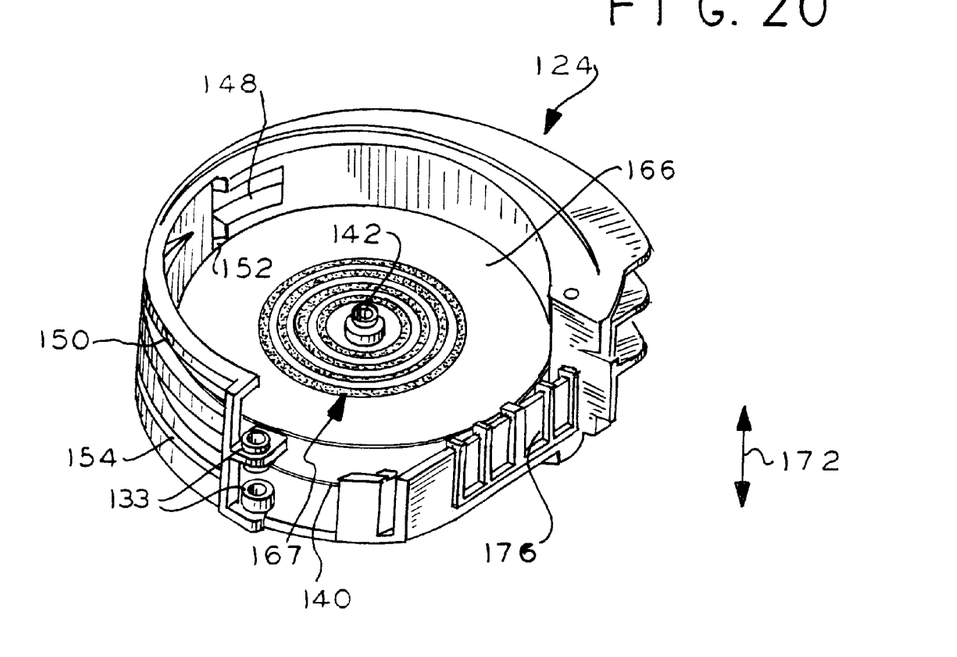
FIGS. 20 and 21 are perspective sectional side elevation views showing the electrical interconnection of the rotating cable storage reels to a stationary connector.
Figure 21:
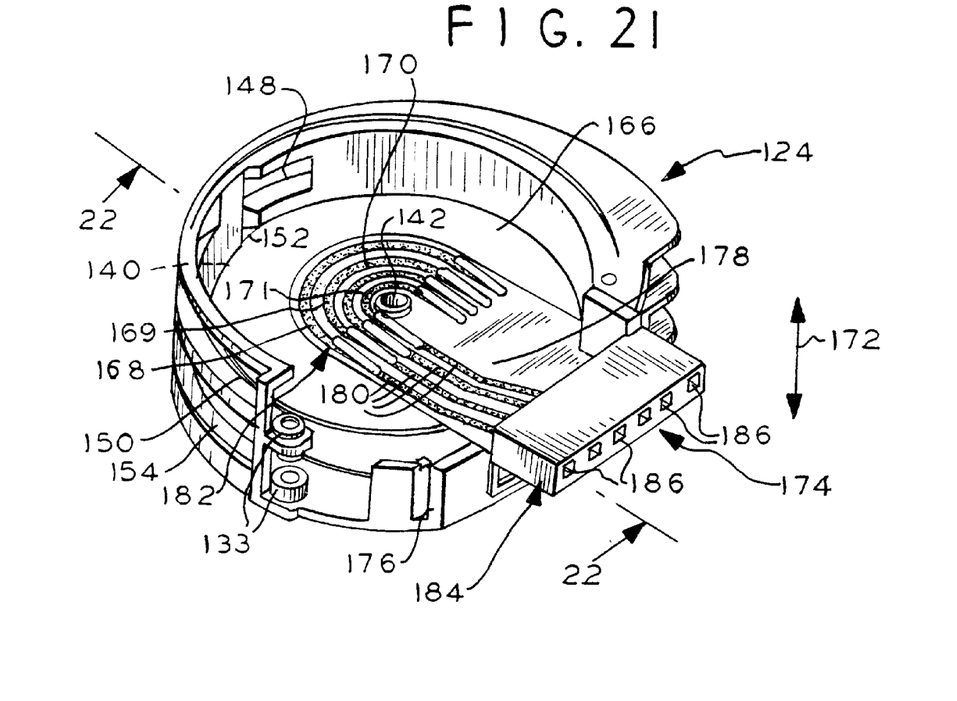

The housing portion 124 as best seen in FIGS. 20 and 21 has a pair of upper slots 148 and 150 in the housing side wall. Slot 150 is aligned with the plane of the upper reel 134 (FIG. 19) ratchet teeth. A like pair of lower slots 152 and 154 are in the housing side wall beneath the slots 148 and 150. The slot 154 is aligned with the ratchet teeth of the lower reel 136. The cables are not shown in FIGS. 17–21 for purposes of clarity of illustration. It should be understood that the drawings are not to scale and some of the elements may be exaggerated for purposes of illustration. The upper lever 130, FIG. 17, has a portion 156 that protrudes through the slot 150. The lower lever 128 has a portion 158, FIG. 16, that protrudes through the slot 154. The power input and output cables are received through the slots 148 and 152.

In operation of the ratchet mechanism 127, when the portions 156 and 158 of the levers are depressed, the respective pawls 146 (FIG. 17) disengage from the corresponding ratchet tooth of the associated lever. The constant force springs 146 are arranged so that in the cable release state, the corresponding reels wind the respective cable about the reel in the reel channel 138 or 140 so the cables are fully wound to the quiescent position and the respective cable plugs such as 6 and 8, FIG. 3, are drawn against the housing 112.

When the corresponding cable is pulled, its reel will rotate in direction 160, FIG. 17, and the ratchet teeth 144 ratchet against the inclined ramps 162 of the pawls of the lever 128 or 130, resiliently disengaging the pawls, and tensioning the constant force spring 146. The constant force spring tends to rewind the associated cable, but is stopped by the radial edges 164 of the ratchet teeth locking the reels in the pulled extended position.

The output cable (not shown) attached to the upper reel 134 passes through the slot 148 and the input cable (not shown) attached to the lower reel 136 passes through the slot 152.

Figure 22:
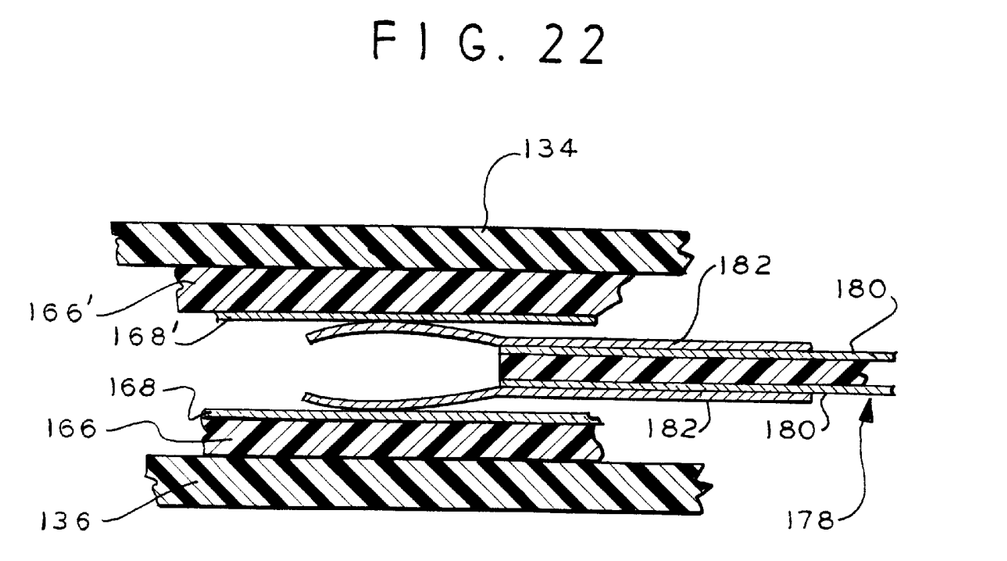
FIG. 22 is a side elevation sectional view of the slip contacts taken along lines 21—21 of FIG. 21 for connecting the stationary connector of to the rotating cables on the reels.

In FIGS. 20 and 21, a circular printed circuit board disc 166 is secured to a broad surface of the power input lower reel 140 facing the upper reel 138 (not shown in these figures). The disc 166 has an array 167 of four concentric circular conductors 168–171 deposited or otherwise attached to a surface thereof. It will be appreciated that a different number of conductors may be employed in other embodiments. In the alternative, the conductors may be formed directly on the broad surface of the reel. An identical disc 166', FIG. 22, is secured to a broad surface of the upper reel 138 facing the lower reel 140 and disc 166. The conductors on the two discs are juxtaposed in the axial directions 172 and face each other.

A connector slip ring board assembly 174 is mounted on a mating wall 176 of the housing reel portion 124. The assembly 174 comprises a printed circuit board (PCB) 178, FIGS. 21 and 22, four conductors 180 printed on one side of the board 178, shown in FIGS. 20 and 21, and two conductors on the under side (not shown). An array of four spring cantilevered contacts 182 connected to the board 178 are each ohmically connected to each conductor 180 on the upper side as shown in FIG. 21. The contacts 182 overly and are also in ohmic contact with and correspond to each of the disc conductors 168', FIG. 22, (four-not shown in the figures) on the upper reel 134.

The conductors 180 are coupled at their ends opposite to socket connector 184. The connector has six contacts 186. Four of the contacts 186 connect to the four conductors 180. The four conductors 180 coupled to the contacts 182 thus are connected electrically to the conductors on the upper power output reel 138. The four annular conductors on the upper reel are connected to the conductors of the cable wrapped about the upper reel, assuming in this instance that the upper cable is the output cable and plug to the portable computer. The other two contacts 186 are connected to two associated conductors 180, FIG. 22, on the board 178 underside for coupling to the lower reel conductors via two contacts 182.

In FIG. 22, for example, board 178 conductors 180 are on opposite sides of the board. A spring contact 182 is ohmically connected to each of the conductors 180 on each side of board 178. The upper reel 134 has a printed circuit disc 166' identical to disc 166 attached to lower reel 136. A contact 182 on the top side of the board 178 engages the conductor 168' on the bottom of the upper reel 134 disc 166. Similarly, a contact 182 on the bottom side of the board 178 engages a conductor 168 on the top side of the disc 166 on the lower reel 136.

The lower reel 136 disc 166 has only two contacts 182 engaged therewith. The lower real 136 carries the input power cable. The conductors of the upper and lower cables are ohmically engaged with the respective conductors on the corresponding discs. The two conductors on the bottom side of the board 178 are each connected to a different one of the contacts 186, FIG. 21, of the connector 184, FIG. 21. The four conductors on the top of the board 178 are connected to four of the contacts in the connector 184.

The contacts 186 of the connector 184 are connected to the circuit 120, FIG. 19, via plug 121 male contacts 123 and cable 125. Two of the contacts 186 are connected for power conversion from the circuit 120. The power is converted from the input power from the lower reel cable applied to two of the connector 184 contacts 186. The contacts 186 of the connector 184 thus are all wired to the appropriate contacts in the circuit 120 by cable 125. Thus two conductors on board 178 to the upper reel 134 apply converted output power to the output plug from the circuit 120. Two other conductors on the board 178 apply control signals to the output plug from the circuit 120. Such control signals may be used to shut the output device, e.g., a computer, off that is connected to the output plug, for example, or may be used to send other control signals to the output device coupled to the upper reel cable and plug. The input power is thus coupled to the converter circuit 20 by the conductors 168 on the lower reel 136, the connector PCB 178, and plug 121-cable 125 unit.

Obviously, many modifications and variations of the present invention are possible in light of the above teachings. It is therefore to be understood that within the scope of the appended claims, the invention may be practiced otherwise than as specifically described.

What is claimed is:

1. An electrical power adapter for a portable computer comprising:

an electrical power input plug with a first cable, the input plug including a body and means for accessing power in an automotive outlet;

a power outlet plug with a second cable;

a third plug for accessing power from an outlet different than the automotive outlet, the input and third plugs including means for releasably connecting each other to form a single plug;

a converter for converting electrical power received by the input plug to an output power at the output plug; and retraction means for the first and second cables, said retraction means including first and second reels, each for receiving and independently retracting a different cable.

2. The adapter of claim 1 wherein the third plug is a power plug for a standard airline power socket for passengers or auto-air adapter secured to the input plug body.

3. An electrical power adapter for a portable computer comprising:

an electrical power input plug with a first cable, the input plug having a longitudinal axis;

a power output plug with a second cable;

a converter for converting electrical power received by the input plug to an output power at the output plug;

retraction means for the first and second cables, said retraction means including first and second reels, each for receiving and independently retracting a different cable; and a housing for containing the retraction means and the converter, the housing including support means for holding the input plug axis upright relative to gravity on a horizontal support.

4. An electrical power adapter for a portable computer comprising:

an electrical power input plug with a first cable, the input plug including a terminal pin;

a power output plug with a second cable;

a converter for converting electrical power received by the input plug to an output power at the output plug; and retraction means for the first and second cable, said retraction means including first and second reels, each for receiving and independently retracting a different cable; and a housing for containing the retraction means and the converter, the housing including a slider arranged to releasably hold the pin and input plug to the housing.

5. The adapter of claim 4 wherein the input plug has a longitudinal axis, the housing including support means for holding the input plug axis horizontal relative to gravity on a horizontal support.

6. A power converter adapter for use with an electrical power source of a given voltage and current comprising:

a housing;

a first plug connected to a first cable for receiving the given voltage and current as an input and applying the input to the first cable;

a converter for converting power received as the input on the first cable to an output electrical power having a voltage and current different from the power received as the input on the first cable;

a second cable for receiving output power from the converter and applying the received output power to an output plug for coupling the output power to an electrical apparatus; and a slider connected to the housing for releasably securing the first plug to the housing.

7. The adapter of claim 6 including a first reel coupled to the housing for retracting the first cable and a second reel coupled to the housing for retracting the second cable independently of the action of the first reel.

8. The adapter of claim 7 wherein the reels are juxtaposed in overlying relation.

9. An adapter plug for mating with a socket for first and second sources of electrical power comprising:

a first plug having a first housing and a first set of contacts for mating with a first socket for receiving the power from the first source; and a second plug having a second housing for coupling to the first housing and having a second set of contacts for mating with a second socket for receiving the power from the second source, the first plug including third contacts for mating with and releasably receiving the second set of contacts to form a single adapter of said first and second plugs.

10. An electrical adapter comprising:
a first plug for mating with a first socket and applying electrical power of a first value to a first cable;
a converter for converting the electrical power on the first cable to a second value;
a second cable for receiving the converted electrical power including a second plug for applying the converted power to a socket; and
retraction means for independently retracting each said cable, said retraction means comprising first and second retraction reels each for receiving a different cable, the reels being disposed one over the other; and
a housing for receiving said converter and retraction means and coupling means secured to the housing for movably coupling each said reels and for movably coupling electrical power in each cable to said converter, the means for movably coupling the electrical power including slip ring means coupled to the means for movably coupling each of said reels.

11. The adaptor of claim 10 wherein said first and second reels are juxtaposed one over the other.

12. The adapter of claim 11 wherein the coupling means includes at least one coupler secured to the housing for coupling the first and second reels for independent rotation in response to a pulling force on the corresponding cable.

13. A housing for releasably securing an elongated power adapter plug comprising:
a base;
a compartment including circuit means for converting electrical power from one value to a second value, the base for supporting the compartment vertically; and
an elongated compartment for receiving the adapter plug and releasably securing the plug vertically.

14. The housing of claim 13 including a pair of cables, a first for connecting the circuit means to the plug and a second connected for connecting the circuit means to an output plug, and a pair of cable retraction reels in the base for independently retracting a cable connected to said adapter and an output plugs.

15. A power converter adapter for use with an electrical power source of a given voltage and current comprising:
a first plug connected to a first cable for receiving the given voltage and current as an input and applying the input to the first cable;
a converter for converting power received as the input on the first cable to an output electrical power having a voltage and current different from the power received as the input on the first cable;
a second cable for receiving output power from the converter and applying the received output power to an output plug for coupling the output power to an electrical apparatus;
a first reel for retracting the first cable; and
a second reel for retracting the second cable independently of the action of the first reel;
the first plug including a third plug for mating with a socket different than the first plug.

16. An electrical power adapter for a portable computer comprising:
an electrical power input plug with a first cable;
a power output plug with a second cable;
a converter for converting electrical power received by the input plug to an output power at the output plug;
retraction means for the first and second cables, said retraction means including first and second reels, each for receiving and independently retracting a different cable; and
a housing for the converter and retraction means, the housing having a first compartment for the converter and a second compartment for the retraction means.

17. An electrical power adapter for a portable computer comprising:
an electrical power input plug with a first cable;
a power output plug with a second cable;
a converter for converting electrical power received by the input plug to an output power at the output plug; and
retraction means for the first and second cables, said retraction means including first and second reels, each for receiving and independently retracting a different cable, the retraction means including first and second cable receiving reels, a plurality of annular conductors coupled to each reel, the annular conductors associated with the first reel for electrical engagement with the conductors of a first cable received in the first reel and the annular conductors associated with the second reel for electrical engagement with the conductors of a second cable received in the second reel, and a connector assembly including a plurality of first contacts for electrically engaging the annular conductors and a plurality of second contacts electrically coupled to the first contacts.

18. The adapter of claim 17 wherein the connector assembly comprises a printed circuit board (PCB) with a plurality of conductors thereon, the first contacts comprising electrically conductive resilient spring material extending from the PCB, the assembly including a first electrical connector comprising a housing including said second contacts, said second contacts in electrically engagement with said PCB conductors.

19. The adapter of claim 18 further including a second electrical connector including third contacts for engaging the second contacts and a plurality of conductors ohmically coupled to the converter.

20. The adapter of claim 17 wherein the first and second reels are in overlying juxtaposed relation.

21. The adapter of claim 20 including a housing for said converter and retraction means, and further including a plurality of ratchet teeth associated with each reel, each reel for independently receiving and retracting a different one of the first and second cables, and a lever with a pawl associated with the ratchet teeth of each reel movably coupled to the housing for resiliently releasably engaging the teeth of the associated reel to retain the associated reel in set position in a lever quiescent state and for permitting the associated reel to fully retract from the set position in a lever activated state.

22. The adapter of claim 21 including a spindle secured to the housing, the reels for rotation about the spindle, and a constant force spring secured to each reel and to the spindle for resiliently urging each reel to a fully retracted position.

23. An electrical power adapter for a portable computer comprising:
an electrical power input plug with a first cable;
a power output plug with a second cable;
a converter for converting electrical power received by the input plug to an output power at the output plug, the converter including means for generating a control signal applied to said output plug in addition to said output power for controlling said computer; and
retraction means for the first and second cables, said retraction means including first and second reels, each for receiving and independently retracting a different cable.

* * * * *